Oct. 28, 1924.
J. G. ZOLLEIS
1,512,971
COFFEE URN
Filed April 19, 1922
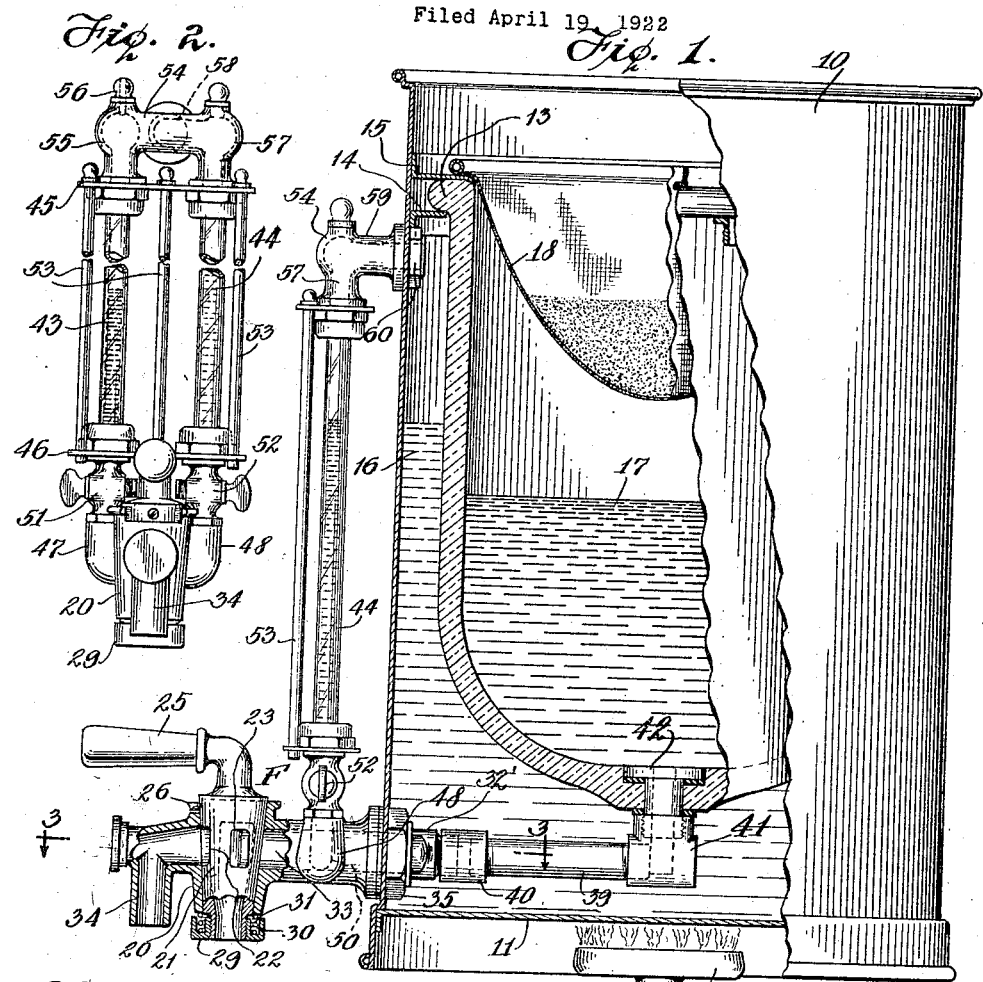
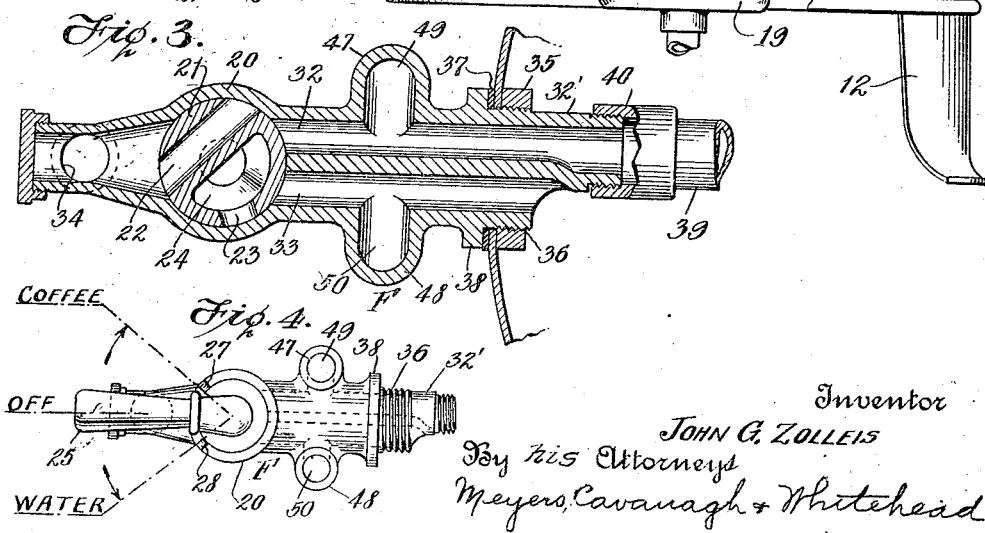
Inventor
JOHN G. ZOLLEIS
By his Attorneys
Meyers, Cavanagh & Whitehead Patented Oct. 28, 1924.

1,512,971

UNITED STATES PATENT OFFICE.

JOHN G. ZOLLEIS, OF NEWARK, NEW JERSEY.

COFFEE URN.

Application filed April 19, 1922. Serial No. 555,570.

*To all whom it may concern:*

Be it known that I, JOHN G. ZOLLEIS, a citizen of the United States, and resident of Newark, in the county of Essex and State of New Jersey, have invented certain new and useful Improvements in Coffee Urns, of which the following is a specification.

This invention relates to improvements in urns such as coffee urns and more particularly to urns especially constructed and adapted for selectively dispensing or serving any of a plurality of different beverages as may be required; and has special reference to the provision of an urn of this nature in which a single valve or faucet is employed and may be controlled for selectively dispensing the desired beverage at will.

One of the well known types of coffee urns now extensively marketed and employed comprises an outer water tank or receptacle in which is suspendedly arranged an inner coffee receptacle, the outer receptacle or tank serving as a boiler for heating the coffee in the inner receptacle. For dispensing the coffee from the urn a faucet is employed mounted on the outer receptacle and connected for communication to the inner coffee receptacle, and for removing the contents of the outer receptacle or tank a second faucet also mounted on the water receptacle and spaced from the coffee faucet is utilized, each of the said faucets being supplied with a suitable liquid gauge for indicating the level of either the coffee or water in the respective receptacles. As these urns are at present employed, only the content of the inner receptacle is used for beverage purposes, the outer tank being in most instances utilized only for heating the beverage in the inner container or receptacle. A prime desideratum of my present invention comprehends the provision of an urn of this type improved so that the contents of the outer receptacle may be dispensed for drinking purposes, the water in the said receptacle being, for example, utilized for tea, and so that the contents of both receptacles may be selectively served or dispensed in accordance with the demands of a customer, the invention including the utilization of a single faucet or cock which may be controlled to deliver or dispense either the coffee or the tea at will.

A further principal object of the present invention comprehends the provision of an urn of the nature referred to in which the faucets and gauges are combined into a unitary construction or fitting so that not only will the different beverages be dispensible at a single source, but so that the level of both beverages will be simultaneously viewable and observable by the operator or dispenser, the entire dispensing equipment to be used with both receptacles of the urn being thus simultaneously under the control and observation of the operator. By providing this unitary construction, moreover, I am enabled to considerably reduce the cost of manufacture of the urn and to obtain an urn construction having a neat and attractive appearance.

To the accomplishment of the foregoing and such other objects as may hereinafter appear, my invention consists in the elements and their relation one to the other, as hereinafter particularly described and sought to be defined in the claims, reference being had to the accompanying drawings which show a preferred embodiment of my invention and in which:

Figure 1 is an elevational view of an urn showing my improvements thereto, parts of the urn shown in cross section and other parts broken away, Figure 2 is a front view of my unitary faucet and gauge construction employed with the urn, Figure 3 is an enlarged fragmentary cross sectional view of the same taken on the line 3—3, Figure 1, and Figure 4 is a top plan view of the same on a reduced scale.

Referring to the drawings, the urn comprises the usual outer receptacle or cylindrical water tank 10 having the bottom 11 and provided with a plurality of legs such as 12 and an inner receptacle 13 suspendedly arranged within the outer receptacle, the said inner receptacle being provided with an upper flange portion held between spaced annular supports 14 and 15 attached in any desired manner to the outer receptacle, the outer tank or receptacle 10 being intended for holding a supply of water such as 16, the inner receptacle being intended for containing a supply of coffee such as 17. The inner receptacle 13 is provided with the usual bag 18 arranged at the top thereof for holding the coffee grounds. For heating the water in the tank or receptacle 10 there may be provided the usual burner or other heat source 19.

As heretofore mentioned, a principal object of the present invention comprehends the provision of an urn construction in which the liquid supplies 16 and 17 held by the outer and inner receptacles respectively may be utilized at will for beverage purposes and in which a single faucet may be controlled for selectively withdrawing or dispensing the different beverages at will. To these ends my invention comprehends the provision of a unitary faucet construction F arranged for communicating connection with the outer and inner receptacles 10 and 13 respectively. The faucet F comprises a valve casing 20 and a valve member 21 movable therein, the said valve member being preferably in the form of a tapered plug as shown in the drawings, the said plug comprising a two-way valve member and being provided with the transverse passage 22 and with a port 23 in the side wall of the plug communicating with a conically shaped axial passage or outlet 24. The plug 21 is rotatable in the casing 20 by means of the handle 25, a pin 26 cooperating with opposite shoulder portions 27 and 28 in the casing 20 being provided for limiting the rotation of the plug 21 in opposite directions. For resiliently urging the valve plug 21 in its seat in the casing 20 the said plug may be provided with the nut 29 threadedly received at an end of the plug, as clearly shown in Figure 1 of the drawings, the said nut being provided with an annular recess 30 housing a spring 31, which spring is interposed between the nut 29 and the valve casing 20 for normally seating the plug positively in the said casing. The faucet F is further provided with a plurality of independent liquid conducting passages 32 and 33 adapted for connecting communication with the inner and outer receptacles, as will be made clear hereinafter, and arranged for selective communication with the independent passages of the valve member 21. The axial passage 24 of the plug defines one of the discharge outlets of the faucet and for providing an independent discharge outlet the faucet additionally includes the front spout 34.

The faucet F is connected to the inner and outer receptacles 13 and 10 and to this end the faucet is mounted on the wall of the outer receptacle 10, as by means of a nut 35 threadedly engaged on a correspondingly threaded portion 36 of the faucet fitting, a gasket 37 being preferably provided between the wall of the receptacle 10 and a flange portion 38 of the fitting for providing the desired seal, the passage 33 of the faucet opening directly into the compartment defined by the outer receptacle 10 and the passage 32 being connected to the inner compartment or receptacle as by means of a nipple 39 connected at one end to an extension 32′ of the conducting passage 32 by means of the coupling 40 and connected at its other end to the receptacle 13 as by means of the T or L fitting 41 and the flanged bushing 42.

With this described construction it will be seen that the plug 21 may be rotated in any of three positions as diagrammatically shown in Figure 4 of the drawings, a central position and two end positions on opposite sides thereof, the faucet being closed with the handle 25 in the central or "off" position, the passage 22 of the plug connecting the outlet spout 34 with the conducting passage 32 for dispensing coffee through the spout 34 when the handle 25 is rotated clockwise as viewed in Figure 4 to its limiting position, the duct 23 and axial passage 24 of the plug being connected to the conducting passage 33 for dispensing water when the handle 25 is rotated counterclockwise to its limiting position as shown by the arrow in Figure 4. With the provision of this construction it will be seen that coffee or water may be selectively dispensed or discharged by controlling the handle 25 of the valve or faucet, the water and coffee being conducted throughout through independent passages so that the water delivered will be entirely free from any coffee drips.

As further hereinbefore stated, another principal object of the present invention comprehends the provision of an urn in which the faucets and gauges of prior constructions are combined into a unitary fitting so that not only will the different beverages be dispensable at a single source, but so that the level of both beverages will be viewable and observable at the same time by the operator or dispenser. To these ends I combine the faucet F with the double liquid gauges utilized with the inner and outer receptacles, the liquid gauges being arranged side by side for simultaneous observation and connected to the independent passages 32 and 33 of the faucet F. The gauge means of my invention may comprise the glass tubes 43 and 44 attached to the upper and lower plates 45 and 46 respectively and connected for communication to the passages 32 and 33 respectively, the faucet fitting being provided with bosses 47 and 48 having the by-paths 49 and 50 communicating with the tubes 43 and 44, emergency cocks 51 and 52 being provided in the lines of communication between the gauges 43 and 44 and the by-paths 49 and 50. Connecting the plates 45 and 46 there may be provided the plurality of spaced rods 53. The gauge means further includes an upper fitting 54 which is preferably of inverted U-shape, having one branch 55 of the U connected to the gauge tube 43, the said branch being open to atmosphere and provided with the vent 56. The other branch 57 of the fitting 54 communicates with the gauge tube 44 and connects the same as by means of a transverse passage 58 and the centrally arranged integral nipple 59 to the outer receptacle or compartment, the nipple 59 being attached to the walls of the outer receptacle 10 as by means of the nut 60 threadedly received by a correspondingly threaded portion of the said nipple. With this construction I not only provide a unitary faucet and gauge means which may be controlled for the selective dispensing of beverages and in which the contents of both receptacles may be simultaneously observable by the dispenser, but in which I am enabled to considerably reduce the cost of manufacture of the urn and the fittings and equipments therefor, an urn construction being, moreover, obtainable in which all the fittings are located centrally thereof, presenting a neat, attractive and highly pleasing appearance.

The manner of making and using my improved urn will, in the main, be apparent from the above detailed description thereof. It will be apparent that with the construction provided the water in the water receptacle 10, in addition to being utilized for heating purposes, may be utilized as a beverage for dispensing purposes, a single faucet F under the selective control of the operator for dispensing at will either of two beverages being employed. It will be further fully apparent that the dispensing source for both beverages is localized, control and observation of the contents of the receptacle being thus afforded at a single station.

It will be evident from the description that there is a plurality of receptacles, one suspended within the other, together with means to selectively dispense from either receptacle. The said means comprises a valve casing having a Y-shaped passage, the branches of which extend alongside each other in parellel relation, and are connected with the respective receptacles, the body constituting an outlet for one passage, and a valve or plug is at the junction of the branches with the body. This valve has a discharge outlet for the other passage and has means to connect in alternation one passage with the body and the other with the outlet of the valve. The casing has means to connect it with the two receptacles, and it carries the sight gauges connected with the receptacle passages, and has means for engaging the outer receptacle to position the gauges and connect one of them with the atmosphere, and the other with the outer receptacle.

While I have shown my device in the preferred form, it will be obvious that many changes and modifications may be made in the structure disclosed without departing from the spirit of the invention, defined in the following claims.

I claim:

1. In combination, a plurality of receptacles, one suspended within the other, and means to selectively dispense from either receptacle, comprising a valve casing having a Y-shaped passage, the branches of the passage connected with the respective receptacles, and a valve at the junction of the branches with the body thereof, said valve having a discharge outlet, and means to connect in alternation one of the passages with said outlet and the other with the body of the casing, said body providing a second outlet.

2. In an urn, an outer receptacle or tank for holding a liquid supply, an inner receptacle within the outer receptacle for holding a second and different liquid supply and a faucet provided with a two-way valve connected for communication to both the said receptacles, the said two-way valve being adapted to be moved into either of two positions for selectively dispensing either of said supplies at will, the said faucet including two independent discharge outlets.

3. In an urn, an outer receptacle or tank for holding a supply of water, an inner receptacle within the outer receptacle for holding a supply of coffee and a faucet comprising a two-way valve and independent ducts connected for communication to both of said receptacles and independent discharge outlets leading from the said valve, the faucet being adapted for selective operation for dispensing either of said supplies at will.

4. In an urn, an outer receptacle or tank for holding a liquid supply, an inner receptacle within the outer receptacle for holding a second and different liquid supply, a faucet detachably connected with both receptacles and having independent ducts or passages communicating with the receptacles, each duct having an independent discharge outlet, and a valve adapted to be moved into either of two positions for selectively dispensing through either duct.

5. In an urn, in combination, a faucet comprising a two-way valve adapted to be selectively moved into either of two positions for selectively or separately dispensing either of two liquid supplies at will and independent passages leading thereto and a plurality of liquid gauges therefor, one connected to each passage, said passages having discharge outlets spaced apart from each other.

6. In an urn, in combination, a faucet comprising a two-way valve, independent passages leading thereto and independent discharge passages leading therefrom and a plurality of liquid gauges therefor, one connected to each of said first mentioned passages.

7. In combination, a unitary fitting comprising a faucet and a gauge means, the said faucet including a valve member having a plurality of passages therethrough and a valve casing including independent passages leading to the valve member, the said gauge means including a plurality of liquid gauges connected together, one gauge connected for communication to each of the said independent passages.

8. In combination, a unitary fitting comprising a faucet and a gauge means, the said faucet including a valve member having a plurality of passages therethrough, a valve casing including independent passages leading to the valve member and independent discharge ducts leading therefrom, the said gauge member including a plurality of gauges connected together, one gauge connected for communication to each of the independent passages.

9. In combination, a unitary fitting comprising a faucet and a gauge means, the said faucet including a valve member having a plurality of passages therethrough, a valve casing including independent passages leading to the valve member, the said gauge means including a plurality of liquid gauges connected together, one gauge connected for communication to each of the said independent passages and means for attaching the said faucet and gauge means to a receptacle.

10. In an urn, in combination, a faucet comprising a two-way valve adapted to be selectively moved into either of two positions for separately dispensing either of two liquid supplies at will, independent passages for the liquids leading to the valve, and a plurality of liquid gauges, one connected to each passage.

11. In an urn having a plurality of receptacles for holding different liquid supplies, a passage comprising a two-way valve, and independent passages leading therefrom to the respective receptacles, said two-way valve having means to selectively dispense either of the two liquid supplies at will, and a plurality of liquid gages, said gages connecting the respective passages with the corresponding receptacles.

Signed at New York city, in the county of New York and State of New York this 13th day of April, A. D. 1922.

JOHN G. ZOLLEIS.